June 10, 1958  R. E. CROOKE  2,837,929
DISC-ROLLER INTEGRATOR
Filed Feb. 21, 1957  2 Sheets-Sheet 1

INVENTOR
RAYMOND E. CROOKE
BY
ATTORNEY

June 10, 1958 — R. E. CROOKE — 2,837,929
DISC-ROLLER INTEGRATOR
Filed Feb. 21, 1957 — 2 Sheets-Sheet 2
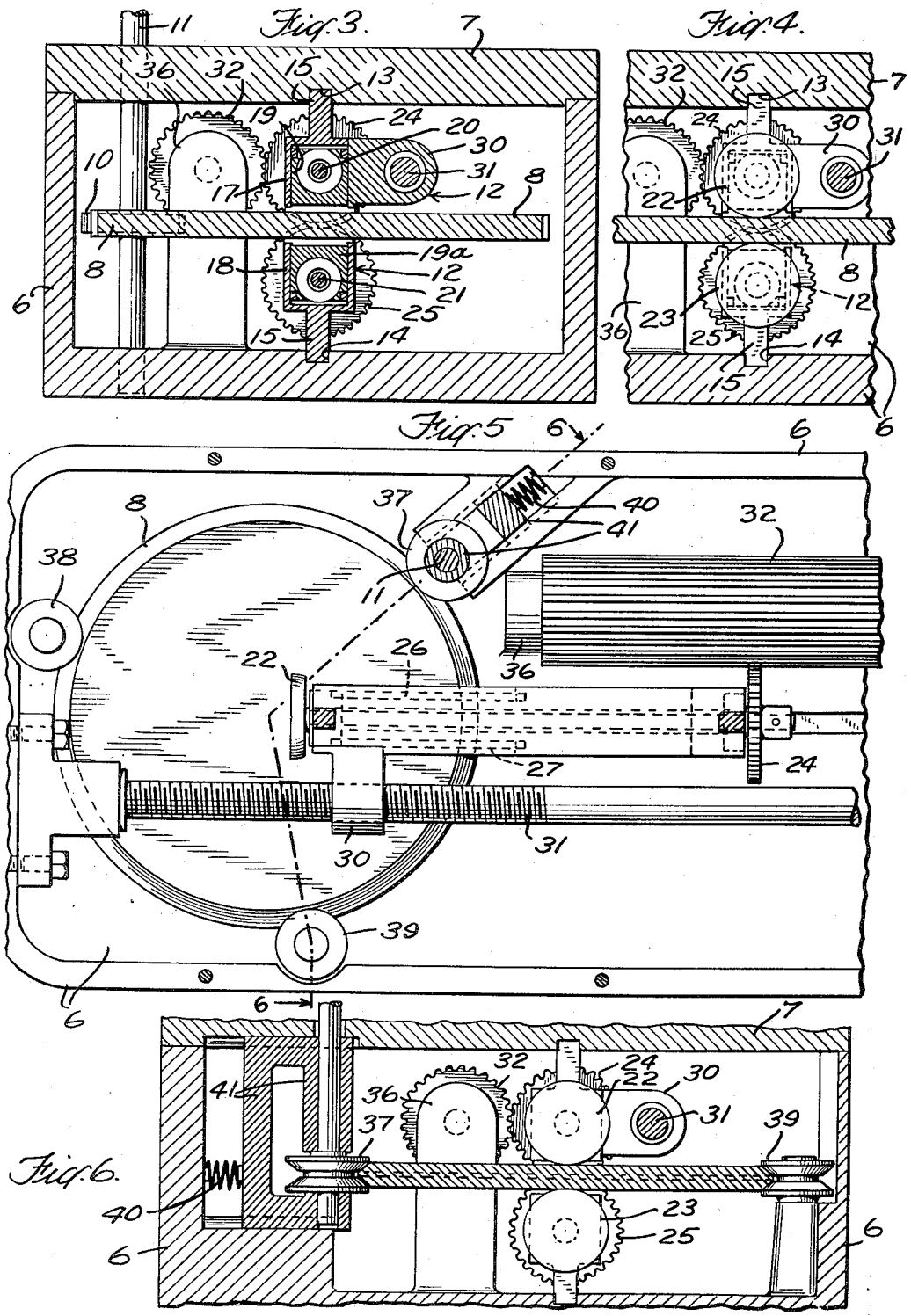

United States Patent Office 2,837,929
Patented June 10, 1958

2,837,929

DISC-ROLLER INTEGRATOR

Raymond E. Crooke, Roslyn, N. Y., assignor to Sperry Rand Corporation, Ford Instrument Company Division, Long Island City, N. Y., a corporation of Delaware Application February 21, 1957, Serial No. 641,718

7 Claims. (Cl. 74—194)

This invention relates to a disc-roller integrator having a carriage of a design which relieves many of the mechanical and operative difficulties of conventional ball disc integrators.

The mechanical disadvantages of disc integrators have been mainly due to the axial force exerted against the disc shaft and bearings by the carriage and roller and the continuous sliding friction of the balls in their bushing which imposes a serious lubrication problem. Additionally, output accuracy is affected by shock and vibration, which tends to change the driving friction between the input and output and even to cause the carriage to alter its position.

This invention proposes to overcome these disadvantages by providing a carriage in a disc integrator which supports a roller in engagement with each side of the disc, each roller being in driving connection with the output roller or cylinder in the integrator. Preferably the rollers are separately biased into friction contact with the disc surfaces so that any diminishing of the pressure as exerted by one of the rollers on the disc surface is compensated by an increase in the pressure contact by the second roller on the other surface of the disc. Because the rollers are oppositely biased against the disc, any axial force on the drive shaft and bearings is substantially eliminated and output predictability is improved due to their independent driving connection with the output roller. Inasmuch as the rollers are not subjected to sliding friction the problem of lubrication is substantially eliminated as compared with the balls in a ball and disc integrator which are subjected to sliding friction within their retainer bushings.

In a modified form of invention the improved integrator has a disc supported and driven exclusively by rollers mounted in the plane of the disc, the usual disc shaft and bearings being replaced thereby.

A more complete understanding of the invention may be obtained by reading the following detailed description of its preferred embodiments in conjunction with the drawings, in which:

Fig. 3 is a transverse section taken on line 3—3 of Fig. 2 showing means for independently conveying the output of the two rollers to the output gear;

Fig. 4 is a fragmentary section similar to Fig. 3;

Fig. 5 is a plan section of an alternate embodiment of invention; and

Fig. 6 is a section taken on line 6—6 of Fig. 5.

Figure 2:
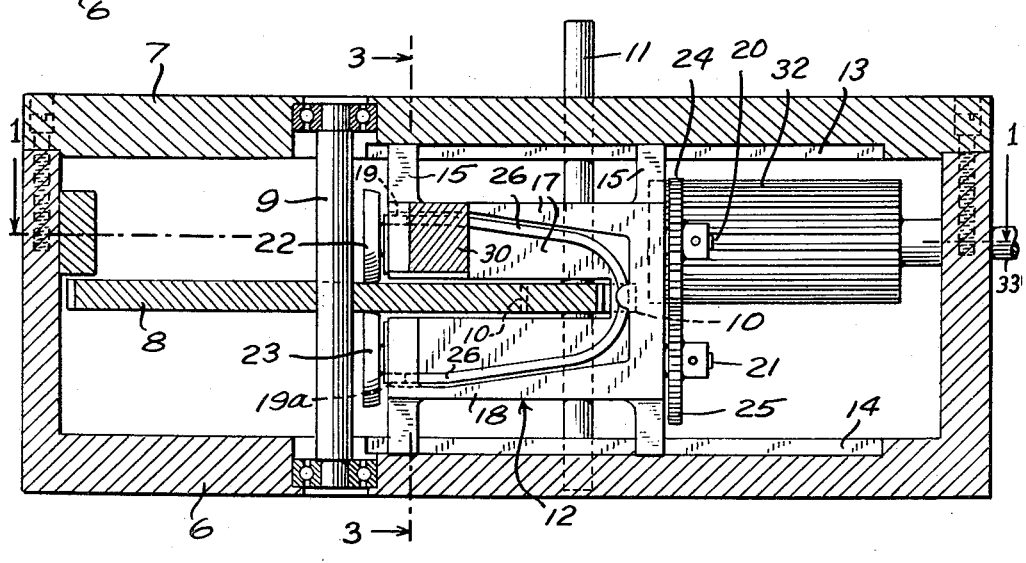
Fig. 2 is a longitudinal section taken on line 2—2 of Fig. 1 showing the two rollers in driven contact with the gear disc.

According to the invention, a preferred embodiment thereof provides an integrating device enclosed within a housing 6 having a removable cover plate 7. A rotative, flat disc 8 is mounted in the housing on a shaft 9 which is journalled in opposed bearings in the housing 6 and the cover plate 7. The disc has peripheral teeth permitting engagement with a driving pinion 10 which is carried on input shaft 11 journalled in the housing 6 and cover plate 7. A U-shaped carriage 12 is slidably supported in slots 13 and 14 in the housing and the side wall by means of lugs 15 which are received by and guided in the slots. The carriage is of integral construction and comprises a pair of connected legs 17 and 18 adapted to straddle the disc and carry in bearing blocks 19 and 19a parallel roller shafts 20 and 21, respectively. The roller shafts extend through the carriage legs and hardened rollers 22 and 23 are mounted on the inner ends thereof. Gears 24 and 25 are mounted on the outer ends of the roller shafts 20 and 21, respectively, and are preferably in meshing engagement as shown in Fig. 2. The bearing blocks 19 and 19a on each side of the disc are carried in vertical slots in the legs of the carriage proximate their inner ends. Flat springs 26 and 27 are recessed in the carriage legs being generally U-shaped and adapted to bear at their free ends on the bearing blocks 19 and 19a in which the roller shafts are journalled. The contact points of the hardened rollers 22 and 23 and the disc 8 are made at the same distance from the center of the disc one above the other on a disc diameter. Contact between the rollers and the disc is assured by the spring load which may or may not be adjustable.

A nut 30 secured to the carriage leg 17 of the carriage 12 is screw-threaded so as to receive feed screw 31 which serves to move the carriage transversely and diametrically across the surface of the disc. It may be noted that the positioning of the carriage may be accomplished by turning the feed screw and the disc simultaneously whereby this input may be introduced with a minimum of sliding friction between the carriage rollers and the disc.

Output gear 32 having elongated and axially disposed pinion teeth slidably engaging one of the roller shaft gears 24 receives the driven output from the carriage. The output shaft 33 on which the gear 32 is mounted is journalled in bearings 34 and 35 which are carried in an upstanding bracket 36, which is supported by the bracket 36, and the housing 6, respectively.

Figure 1:
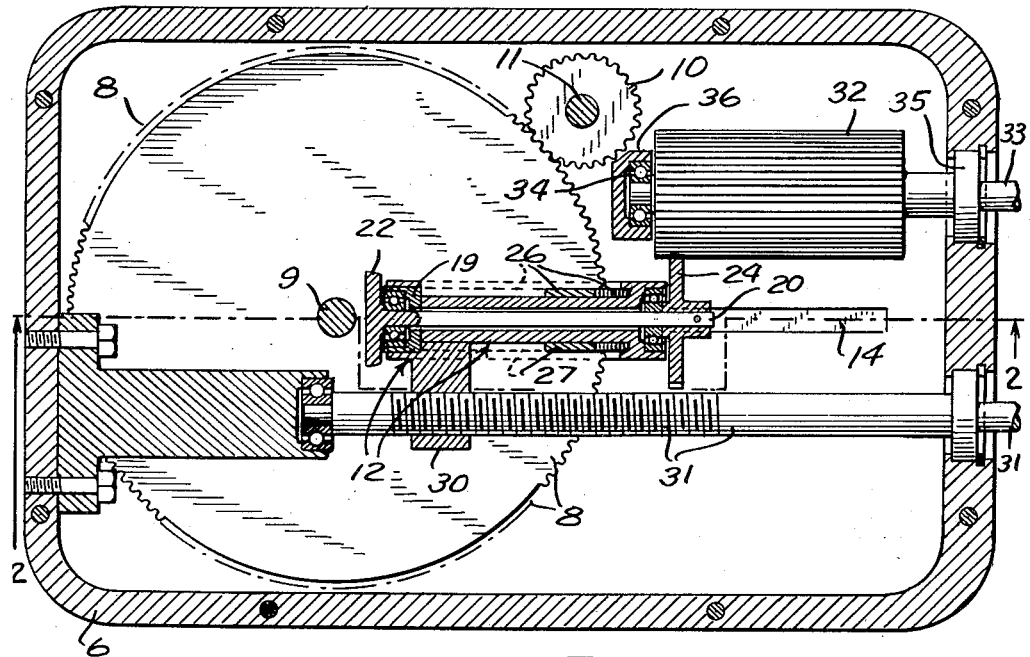
Fig. 1 is a plan section taken on line 1—1 of Fig. 2 showing one embodiment of the disc roller integrator.

The improved integrating device as described above is somewhat limited in its application in that there is utilized only half of the available disc diameter making the instrument large for its stroke and in fact can use something less that the disc diameter due to the presence of the disc shaft 9. Accordingly, as an alternative embodiment, the integrator may dispense with the shaft 9. As shown in Figs. 5 and 6, the disc 8 is supported by the V-grooved rollers 37, 38 and 39 spaced 120° about the circumference of the disc. Roller 37 is the driving roller and replaces the drive gear 10 on the input shaft 11, in the structure shown in Fig. 1. The roller 37 is radially and centripetally biased by a spring 40 which is carried by the housing 6 and is urged against a slide block 41 for the roller shaft so as to maintain a constant and uniform pressure contact between the disc and the drive roller 37 and other support rollers 38 and 39 and to keep the rotation center of the disc fixed.

Various other departures from the preferred embodiment of the invention as may be effected within the scope of invention is defined in the appended claims.

I claim:

1. An integrator of the character described comprising a housing having a base plate and a spaced parallel closure plate, a disc having flat smooth upper and lower faces, means by which said disc is rotatably mounted in said housing between said base and closure plates for rotation about a fixed axis perpendicular to said base and closure plates, input means by which said disc is rotated, a U-shaped carriage having a pair of spaced parallel legs connected together at one end thereof disposed in said housing with one of said legs disposed on one side of said disc and the other of said legs disposed on the opposite side of said disc, a fixed guideway in said housing by which said carriage is slidably mounted for back and forth movement across the surfaces of said disc, an elongated screw shaft rotatably mounted in said housing parallel to said guideway, a second input means by which said screw shaft is rotated, interconnecting means between said carriage and said screw shaft through which said carriage is moved back and forth across the surfaces of said disc by the rotation of said screw shaft, an elongated gear the length of which is not less than the maximum travel of said carriage rotatably mounted in said housing parallel to said screw shaft and said guide way, output means connected to said elongated gear, a pair of shafts one of which is rotatably mounted in one leg of said carriage diametrically of said disc and the other of which is rotatably mounted in the other leg of said carriage diametrically of said disc, a pair of vertically aligned rollers disposed in a plane parallel to the axis of rotation of said disc, one of said rollers being secured to one end of one of said shafts in contact with one surface of said disc and the other of said rollers being secured to the adjacent end of the other of said shafts in contact with the other surface of said disc, a spur gear secured to one of said shafts, and a similar spur gear connected to the other of said shafts in fixed mesh with said spur gear and in sliding mesh with said elongated gear.

2. An integrator as defined in claim 1 in which means are provided in said carriage by which said rollers are yieldingly biased into engagement with the surfaces of said disc.

3. An integrator as defined in claim 1 in which said disc is secured to a shaft which is rotatably supported by and between said base and closure plates and is provided with a peripheral gear, and in which said input means comprises a rotatably mounted shaft having a pinion gear secured thereto in mesh with said peripheral gear.

4. An integrator as defined in claim 1 in which said disc is rotatably supported by a plurality of annularly spaced rollers which engage the periphery of said disc, and in which one of said rollers is a driven roller by which said disc is rotated.

5. An integrator as defined in claim 4 in which one of said rollers is yieldingly biased into engagement with the periphery of said disc.

6. An integrator as defined in claim 5 in which said carriage is provided with means by which said vertically aligned rollers are yieldingly biased into engagement with the surfaces of said disc.

7. An integrator as defined in claim 1 in which said guideway comprises a pair of opposed vertically aligned slots formed in the inner surfaces of said base and closure plates, and in which said carriage is provided with oppositely extending lug means the free ends of which are slidably mounted in said slots.

References Cited in the file of this patent

UNITED STATES PATENTS

| 981,797 | Runner | Jan. 17, 1911 |
| 1,076,155 | Ryan | Oct. 21, 1913 |

FOREIGN PATENTS

| 2,339 | Great Britain | Dec. 1, 1904 |